May 12, 1959        R. BINDER        2,886,665
CONTROL SWITCH FOR ELECTRICALLY-ACTUATED CLUTCH
Filed June 8, 1956
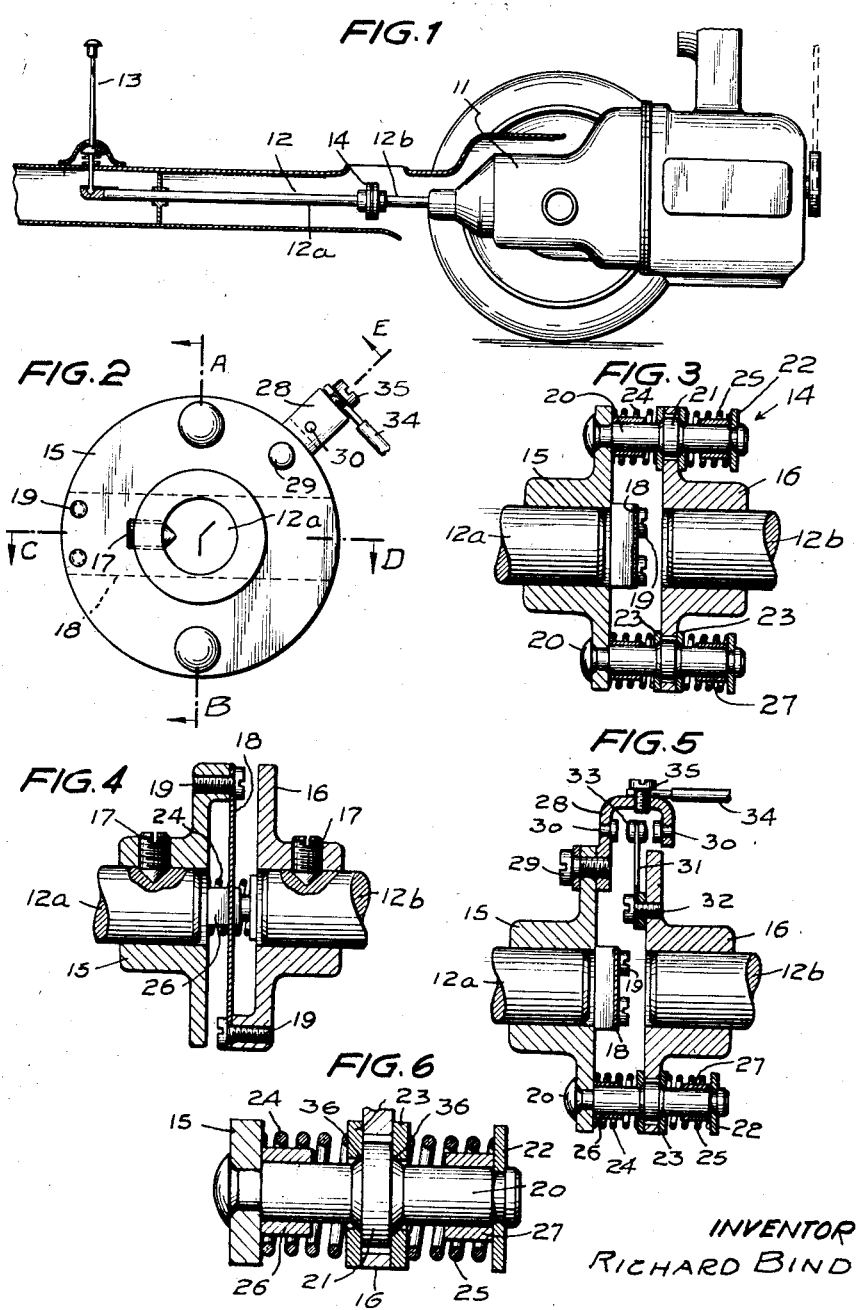
INVENTOR
RICHARD BINDER
By Richardson, David and Morton
his ATTYS.

United States Patent Office 2,886,665
Patented May 12, 1959

2,886,665
CONTROL SWITCH FOR ELECTRICALLY-ACTUATED CLUTCH

Richard Binder, Schweinfurt am Main, Germany, assignor to Fichtel & Sachs A.G., Schweinfurt am Main, Germany, a corporation of Germany Application June 8, 1956, Serial No. 590,308
Claims priority, application Germany June 14, 1955
12 Claims. (Cl. 200—61.46)

The present invention relates to control switches adapted for inclusion between the ends of an elongated mechanical control rod, the switch being actuable by forces accompanying longitudinal movements of the control rod under load while preventing relative rotational movements of the two ends of the rod. The switch also serves to prevent the transmission of undesired vibrations along the control rod.

The switch of the present invention is particularly suited for use in automotive vehicles of the type wherein an electrically controlled clutch is automatically disengaged by gear shifting movements of the gear shift lever and more particularly, in vehicles of this type, where the clutch and transmission are remote from the gear shift lever, a control rod being provided which extends from the gear shift lever to the transmission for shifting gears. In this particular type of vehicle, a resilient joint is usually provided in the control rod to prevent noise arising from the transmission of undesired vibrations through the control rod to the gear shift lever.

The switch of the present invention serves both as a clutch control switch and as a resilient joint acting as a mechanical filter. Advantageously, the switch may be located close to the clutch so that the electrical conductors of the clutch control circuit are of short length, thereby effecting economies in the costs of manufacture and maintenance.

The switch comprises two interconnected coupling members. In the illustrative example described in greater detail below, this particular control rod is considered to be the gear shift rod of a motor vehicle and extends from the gear shift lever to a transmission remote from the gear shift lever. Inclusion of the switch divides the control rod into two axially aligned sections. Each of the coupling members is connected to one of the control rod sections. A flat leaf spring interconnects the coupling members for preventing relative rotational movement therebetween while permitting relative axial movement in response to longitudinal forces exerted on the control rod in the course of shifting gears. Double acting compression springs are provided which yieldingly maintain a predetermined spacing between the coupling members. An electrical switch is carried by the coupling members and is actuated by changes in the spacing therebetween.

The invention will now be described more fully with reference to the accompanying drawing, wherein:

Fig. 1 is an elevational view, with portions of the structure omitted, schematically illustrating the novel switch included in the control rod which extends between the gear shift lever and transmission of a motor vehicle having its engine at the rear;

Fig. 2 is an end view of a switch according to the invention;

Fig. 3 is a sectional view taken along line A—B of Fig. 2;

Fig. 4 is a sectional view taken along line C—D of Fig. 2;

Fig. 5 is a sectional view taken along line E—B of Fig. 2; and

Fig. 6 is a view on an enlarged scale of a guide pin and compression spring shown in Fig. 3.

Referring now more particularly to the drawing, in Fig. 1 there is shown the transmission 11 of a vehicle connected by a control rod 12 to a gear shift lever 13 arranged adjacent the driver's seat (not shown). The gear control rod 12 is subdivided by the switch 14 into two sections 12a, 12b.

As shown in Fig. 3, the switch 14 comprises two flanged coupling members 15, 16, respectively, fixedly connected to the axially aligned rod sections 12a, 12b by screws 17 (Fig. 4). One end of a flat leaf spring 18 is connected by screws 19 to the flange of member 15 while the other end is connected by screws 19 to the flange of member 16. Thus torsional force is transmitted through the switch 14 by means of spring 18, although the spring permits axial movement of the coupling members with respect to each other.

On the flange 15 there are secured guide rods 20 each having intermediate its ends an enlarged shoulder 21 equal in thickness to the thickness of the flange portion of member 16. These shoulders 21 are accommodated in clearance holes provided in coupling member 16, the diameters of the clearance holes exceeding the diameters of the enlarged shoulders so that the enlargements 21 do not contact the sides of the clearance holes. A washer 22 is provided adjacent the free end of each guide rod 20 and further washers 23 engage each guide rod 20 on opposite sides of each enlargement 21. A compression spring 24 is prestressed between the flange of member 15 and each washer 23 and a similar spring 25 is prestressed between each abutment or end washer 22 and its respective enlargement engaging member 23. In this manner the washers 23 are pressed against the opposite sides of flange of member 16 and hold the enlargements 21 within the clearance holes of member 16 so that a predetermined spacing between the coupling members is maintained.

The prestressing of the springs 24, 25 is such that it is overcome upon operation of the lever 13 to shift gears thereby producing relative axial movement between the coupling members. On the other hand, the prestressing of these springs is sufficiently strong to prevent relative displacement of the coupling members merely through vibrations which occur during travel.

The maximum axial displacement between the members 15, 16 is limited by spacer sleeves 26, 27 mounted on the guide rods 20 on either side of shoulders 21. If the gear shift lever 13 is moved to the left as seen in Fig. 1, member 15 in Fig. 3 will move to the right independently of coupling member 16 until sleeve 26 abuts against washer 23 after which the member 16 will move axially together with member 15. In the reverse direction, after a certain amount of movement of coupling member 15, sleeve 27 will abut the washer 23 and carry member 16 along with the other coupling member 15.

As shown in Fig. 5, a U-shaped bow 28 is secured to the flange portion of coupling member 15 by means of a screw 29, the bow 28 carrying a pair of electrical contacts 30. A contact spring 31 is secured by screw 32 to flanged joint half 16 and is provided with a pair of oppositely facing contacts 33. Contacts 30 are connected to a clutch control conductor 34 connected by a terminal screw 35 on the bow 28. Upon displacement of member 15 a predetermined amount in either direction relative to coupling member 16 during the act of shifting gears, one of contacts 30 engages one of the contacts 33 to complete an electrical circuit which controls engagement and disengagement of the clutch (not shown). The electrical insulation required for bow 28 has been omitted for simplicity of illustration.

Since the shoulders 21 of the guide rods 20 have considerable lateral play in the clearance holes of flange 16 and the two flanged coupling members 15 and 16 are directly connected with each other only by the leaf spring 18, scarcely any friction can occur within the switch upon the relative axial movement of the two members 15 and 16 during gear shifting. There is only the possibility that the washers 23, even though their bore is larger than the outside diameter of the guide rods 20, will rub against the guide rods, if they are not concentric to the guide rods. This possibility can be prevented in a simple manner by providing a small taper 36 as shown in Fig. 6 or possibly a fillet at the junction between the enlargement or shoulder 21 and the cylindrical shank of the guide rod 20 and by making the bore of the discs 23 considerably greater or imparting thereto complementary tapered central holes which engage the taper 36. In this way, the discs 23 are maintained centered so that upon the movement of the member 15, sliding contact between the bores of the washers 23 and the cylindrical shank of the guide rod 20 cannot take place since the washers 23 are held fast in centered position against the flanged portion of coupling member 16 by springs 24, 25. The switch therefore operates without any frictional loss.

Various other changes and modifications may be made without departing from the spirit and scope of the present invention and it is intended that such obvious changes and modifications be embraced by the annexed claims.

What is claimed is:

1. An electrical switch adapted to be mechanically serially included in a control rod, said switch being adapted to transmit both rotational and longitudinal movements of said control rod therethrough, said switch being actuated by forces accompanying longitudinal movements of said control rod, said switch comprising: two spaced coupling members adapted for connection to oppositely extending aligned sections of said rod, said coupling members comprising confronting flange portions; double acting spring pressed means maintaining said members in normally fixedly spaced relationship, said members being axially movable toward and away from each other in response to longitudinal forces transmitted through said rod and which are of sufficient magnitude to displace said spring means; and switch means carried by said members and actuable by relative axial movements of said members.

2. A switch according to claim 1, further comprising leaf spring means connecting said flange portions together, said leaf spring means permitting axial displacement of said members relative to one another and coupling said members rigidly together with respect to rotational movements of said rod.

3. An electrical switch comprising two confronting axially aligned coupling members adapted to be connected to oppositely extending coaxially aligned sections of a control rod for transmitting both longitudinal and rotational movements of said rod through said switch, an elongated flat leaf spring interconnecting said two members and extending therebetween perpendicularly across said axis of alignment, said leaf spring connecting said members together for rotary movement while permitting relative axial movement therebetween; prestressed spring means acting simultaneously in opposite directions on both of said members for yieldingly maintaining them axially spaced a predetermined distance apart, said spacing distance being reduced by compressive stresses in said rod and increased by tensional stresses therein sufficient to overcome said spring means; and switch means carried by said members and actuated in response to changes in said spacing distance.

4. A switch according to claim 3, further comprising stop means for limiting the extent of said changes in said spacing distance.

5. A switch according to claim 2, further comprising guide means for said prestressed spring means, said guide means being fixed to one of said members and spaced from the other member to provide a cushioning action preventing the transmission of slight vibrational noise displacements from one member to the other.

6. A combined vibration filtering mechanical joint and electric switch adapted to be included intermediate the ends of an elongated control rod, said rod being divided into two sections by the inclusion of said switch, said switch being responsive to longitudinal forces applied to said rod and restraining said sections against relative rotational movement therebetween, said switch comprising: two axially aligned coupling members each adapted to be fixedly connected to one of said rod sections, axially displaceable means interconnecting asid members for preventing relative rotational movement therebetween; longitudinally extending guide means fixed to one of said members and entering the other member in laterally spaced relationship with respect thereto; double-acting spring means mounted on said guide means, said spring means yieldingly maintaining a predetermined axial spacing between said members, and electrical switch means carried by said members, said switch means being actuable by a change in said axial spacing.

7. A switch according to claim 6, in which said axially displaceable means is a flat leaf spring lying in a plane normal to the axis of said rod.

8. A switch according to claim 7, in which said leaf spring is elongated and extends transversely of said rod axis.

9. A switch according to claim 6, in which said coupling members comprise spaced confronting flanges, and wherein said guide means comprises a plurality of guide rods fixed to one of said flanges and extending through the other flange, each guide rod having abutment means disposed near its free end, said other flange having clearance holes formed therein through which said guide rods extend, the portion of each guide rod within said clearance hole being enlarged, said enlarged portion being effectively longitudinally coextensive with the thickness of said flange; a pair of washers mounted on each guide rod and simultaneously engaging opposite sides of said other flange and of said enlarged portion; a pair of prestressed compression springs mounted on each guide rod at opposite sides of said other flange, one end of each spring engaging one of said washers, the other end of one spring engaging said one flange and the other end of the other spring engaging said abutment means; and switch means mounted on said flange for actuation by a change in the spacing therebetween.

10. A switch according to claim 9, in which said flanges are circular and said guide rods are regularly arranged around a circle concentric with said flanges, said flanges being concentric with the longitudinal axis of said control rod.

11. A switch according to claim 9, in which each guide rod has tapered portions disposed at the junctions between said rod and opposite sides of said enlarged portion, said washers having holes which engage said tapered portions and center said washers with respect to said guide rod for preventing sliding engagement between said washers and said guide rod during actuation of said switch means.

12. A switch according to claim 9, further comprising spacer sleeves mounted on each guide rod at opposite sides of said other flange for limiting the magnitude of said change in said spacing.

References Cited in the file of this patent

UNITED STATES PATENTS

| | | |
|---|---|---|
| 1,814,950 | Moscato | July 14, 1931 |
| 1,903,737 | Moscato | Apr. 11, 1933 |
| 1,922,829 | Tengstrom | Aug. 15, 1933 |
| 2,055,637 | Stanley et al. | Sept. 29, 1936 |
| 2,072,832 | Weydell | Mar. 2, 1937 |
| 2,263,047 | Newton | Nov. 18, 1941 |
| 2,341,756 | Avila | Feb. 15, 1944 |
| 2,622,711 | Chambonneau | Dec. 23, 1952 |